(12) United States Patent
Hannula et al.

(10) Patent No.: US 6,366,893 B2
(45) Date of Patent: *Apr. 2, 2002

(54) SYSTEM, A METHOD AND AN APPARATUS FOR PERFORMING AN ELECTRIC PAYMENT TRANSACTION IN A TELECOMMUNICATION NETWORK

(75) Inventors: Antti Hannula, Espoo; Hannu Kari, Veikkola, both of (FI)

(73) Assignee: Nokia Telecommunications Oy, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/068,280

(22) PCT Filed: Nov. 5, 1996

(86) PCT No.: PCT/FI96/00597

§ 371 Date: Sep. 29, 1998

§ 102(e) Date: Sep. 29, 1998

(87) PCT Pub. No.: WO97/17678

PCT Pub. Date: May 15, 1997

(30) Foreign Application Priority Data

Nov. 7, 1995 (FI) .................................................. 955354

(51) Int. Cl.[7] ............................................. G06F 17/60

(52) U.S. Cl. .............................. 705/40; 705/26; 705/39; 705/53; 705/78; 705/79; 705/41; 455/407; 379/93.12

(58) Field of Search ................................ 705/40, 26, 35, 705/39, 42, 53, 77, 78, 79, 73, 37, 41, 65, 70; 902/24, 40; 235/380; 455/407, 558, 406; 379/93.12

(56) References Cited

U.S. PATENT DOCUMENTS

| | | | |
|---|---|---|---|
| 4,961,142 A | * 10/1990 | Elliott et al. | 705/73 |
| 4,972,463 A | 11/1990 | Danielson et al. | 379/91.01 |
| 5,061,916 A | 10/1991 | French et al. | 340/522 |
| 5,153,907 A | * 10/1992 | Pugh et al. | 379/143 |
| 5,221,838 A | * 6/1993 | Gutman et al. | 235/379 |
| 5,327,544 A | 7/1994 | Lee et al. | 716/18 |

(List continued on next page.)

FOREIGN PATENT DOCUMENTS

| | | | | |
|---|---|---|---|---|
| EP | 0 565 469 | * | 10/1993 | G07B/15/02 |
| EP | 0 658 862 | | 6/1995 | |
| EP | 0 666 670 A2 | * | 8/1995 | H04L/29/06 |
| EP | 0 705 012 | | 4/1996 | |
| WO | WO 93/22860 | * | 11/1993 | H04L/12/66 |
| WO | WO 94/11849 | * | 5/1994 | G07F/7/08 |
| WO | WO 95/08900 | * | 3/1995 | H04Q/7/22 |

OTHER PUBLICATIONS

"EDI/EFT Translator Software from GE Information Services Provides Banks With Unique Reconciliation Services for Their Corporate Clients", PR Newswire, Abstract, Jul. 1990, Dialog File 16:PROMT.*

(List continued on next page.)

Primary Examiner—James P. Trammell
Assistant Examiner—John W. Hayes
(74) Attorney, Agent, or Firm—Altera Law Group, LLC

(57) ABSTRACT

The invention relates to methods and apparatuses for performing electronic payment transactions between a terminal equipment (100) in a telecommunication network and the other transacting party (1,2, . . . ,N). The invention utilizes a special payment service gateway (10) through which all the payment transactions of the terminal equipments in the telecommunication network are routed. The payment service gateway allows the parties of the payment transaction to support different electronic payment protocols (A, B, . . . , X) and performs the required protocol conversions so as to provide an end-to-end transaction.

17 Claims, 5 Drawing Sheets

U.S. PATENT DOCUMENTS

| | | | | |
|---|---|---|---|---|
| 5,336,870 A | * | 8/1994 | Hughes et al. | 235/379 |
| 5,387,784 A | * | 2/1995 | Sarradin | 235/380 |
| 5,410,675 A | * | 4/1995 | Shreve et al. | 710/65 |
| 5,465,206 A | * | 11/1995 | Hilt et al. | 705/40 |
| 5,485,370 A | | 1/1996 | Moss et al. | 709/217 |
| 5,557,780 A | * | 9/1996 | Edwards et al. | 705/37 |
| 5,590,197 A | * | 12/1996 | Chen et al. | 705/26 |
| 5,594,721 A | * | 1/1997 | Pan | 370/392 |
| 5,699,528 A | * | 12/1997 | Hogan | 705/40 |
| 5,717,868 A | * | 2/1998 | James | 705/35 |
| 5,719,918 A | * | 2/1998 | Serbetciouglu et al. | 379/93.12 |
| 5,757,917 A | * | 5/1998 | Rose et al. | 705/26 |
| 5,826,241 A | * | 10/1998 | Stein et al. | 705/26 |
| 5,852,812 A | * | 12/1998 | Reeder | 705/39 |
| 5,870,722 A | * | 2/1999 | Albert et al. | 705/39 |
| 5,873,072 A | * | 2/1999 | Kight et al. | 705/40 |
| 5,878,141 A | * | 3/1999 | Daly et al. | 705/17 |
| 5,907,801 A | * | 5/1999 | Albert et al. | 455/406 |
| 5,970,059 A | | 10/1999 | Ahopelto et al. | 370/338 |
| 6,010,067 A | * | 1/2000 | Elbaum | 235/380 |
| 6,131,040 A | * | 10/2000 | Knuutila et al. | 455/550 |
| 6,169,890 B1 | * | 1/2001 | Vatanen | 455/406 |

OTHER PUBLICATIONS

Osborne et al, "Bank–VAN Duo High–Steps Over Those EDI Blues", Corporate Cashflow, vol. 11, No. 11, pp 72–76, Oct. 1990.*

"NACHA Council Approves First Cross–Border Payment Rules", Corporate EFT Report, vol. 15, No. 19, Oct. 1995, Dialog File 636:Newsletter DB.*

Mouly and Pautet, "The GSM System for Mobile Communications".*

Copy of the International Search Report.

* cited by examiner

SYSTEM, A METHOD AND AN APPARATUS FOR PERFORMING AN ELECTRIC PAYMENT TRANSACTION IN A TELECOMMUNICATION NETWORK

FIELD OF THE INVENTION

The present invention relates to electronic payment mechanisms in telecommunication networks, especially in mobile communications networks.

BACKGROUND OF THE INVENTION

Electronic payment mechanisms will be used widely in the near future for making and receiving payments via telecommunication networks for different services, goods or information, for example. During a transaction, electronic substitutes for money, often called with the general name of electronic tokens, are exchanged between the parties. Digital cash, also called electronic money or electronic cash, is one form of electronic tokens that mainly resembles normal cash. However, electronic tokens may also have been designed as electronic analogues of other forms of payment, including cheques and credit from a bank or some other financial institution. These latter alternatives are designed for those who might prefer to pay on credit or through some other mechanism instead of cash.

In an electronic token system, tokens can be stored on a user's card or in a computer and they can be exchanged directly between remote transacting parties. This exchange does not require a fixed network infrastructure and it can be accomplished through a temporary network connection, e.g. via mobile stations using wireless networks. Other electronic payment mechanisms have also been proposed that require on-line third-party payment servers to process transactions. They differ from electronic token systems in that they depend on a network infrastructure and require the on-line involvement of at least one additional party. Standards concerning electronic payment mechanisms are not yet ready, wherefore there are several competing methods on the market.

One of the most interesting ways of using electronic payment mechanisms, such as digital cash, is to provide a mobile station, such as a portable phone, with such a function. Due to the many competing methods, the actual problem is deciding which electronic payment mechanism should be included in the mobile station. Implementing an electronic payment mechanism in a mobile station takes time and creates considerable design and investment costs. Changing the payment mechanism or adding a new one requires new design and investments. Moreover, there would also be gradually different generations of mobile stations in use and they would require the mobile networks to provide different services. Therefore it would be very important to provide mobile stations with such an electronic payment mechanism that would satisfy the special needs of as many users as possible and that would not have to be changed at least within a reasonably long period. On the other hand, if a new electronic payment mechanism would be introduced to general use somewhere else, from the point of view of competition it would be very useful to have this mechanism in use in mobile stations as soon as possible. Therefore there are different problems and conflicting demands related to implementing an electronic payment service in a mobile system.

The same problems also apply to terminal equipments of other telecommunication networks.

SUMMARY OF THE INVENTION

An object of the invention is such an implementation of an electronic payment service in telecommunication systems, especially in a mobile system, that eliminates or at least alleviates the above-described problems.

This and the other objects and advantages of the invention are achieved with a system according to the invention for performing an electronic transaction between a terminal equipment in a telecommunication system and the other transacting party via a data network. The system is characterized in that it comprises a payment service gateway comprising a first payment protocol interface supporting a first electronic payment protocol for payment transactions with the terminal equipments, at least one other payment protocol interface that is connected to a data network and that supports the same or a different electronic payment protocol as said first electronic payment protocol interface for payment transactions with the other transacting party, and that the payment service gateway is arranged to perform the protocol adaptation of the payment transaction between the first and said at least one other payment protocol interface.

The invention also relates to a method for performing an electronic transaction between a mobile station in a mobile system and the other transacting party via a data network. The method is characterized by routing the payment transaction through the payment service gateway, using the same general electronic payment protocol in all payment transactions between the terminal equipment and the gateway regardless of the electronic payment protocol of said other party, using the electronic payment protocol of said other party in each payment transaction between the gateway and said other party.

According to a preferred embodiment of the invention, in order to allow the use of a terminal equipment of a telecommunication system, such as a mobile station, in association with any electronic payment service standard no matter which standard will be the actual de facto standard, one common payment mechanism is used in all the terminal equipments, and all the computer programs and mechanisms related to any specific payment mechanism are included in a service unit at the network side instead of implementing them in the terminal equipment itself. The service unit will be called a service gateway herein. The terminal equipment may comprise a generic payment interface towards the service gateway, which then acts on behalf of the mobile station towards the other transacting party by using the electronic payment method supported by the other party. In other words, from the point of view of the other transacting party the service gateway acting on behalf of the terminal equipment is similar to any customer using a specific payment mechanism. The service gateway may support several payment mechanisms (towards the other parties) that are available to the terminal equipments. The service gateway then carries out the conversion possibly required between the generic payment interface of the terminal equipment and the payment mechanism used in each case.

Due to the invention, only one common payment mechanism is needed in the terminal equipments and it does not have to be changed, at least not to a great extent, when new payment mechanisms are introduced into the market. Adding a new payment mechanism to a telecommunication system, such as a mobile system, requires changes only in the service gateway. Therefore the new payment mechanism is immediately available to all the generations of terminal equipments once it has been added to the telecommunication system. Further, by means of the invention it is possible to satisfy the different needs of almost all the users, since all the electronic payment mechanisms supported by the service gateway are available to a user.

The invention also relates to a system for performing an electronic transaction between a terminal equipment in a telecommunication system and the other transacting party. The system is characterized in that it comprises a payment service gateway comprising a first payment protocol interface supporting the first electronic payment protocol for payment transactions with said other party, at least one other payment protocol interface that is connected to the data network and that supports the same or a different electronic payment protocol as said first payment protocol interface for payment transactions with the terminal equipment, and that the payment service gateway is arranged to perform the protocol adaptation of the payment transactions between the first and said at least one other payment protocol interface.

The invention further relates to a method for performing an electronic transaction between a terminal equipment in a telecommunication system and the other transacting party. The method is characterized by routing the payment transaction via the payment service gateway, using the same general electronic payment protocol in all payment transactions between the other party and the gateway regardless of the electronic payment protocol of the terminal equipment, using the electronic payment protocol of the terminal equipment in each payment transaction between the gateway and the terminal equipment.

A service gateway according to a second embodiment of the invention provides terminal equipments with different payment mechanisms that are adapted in the service gateway with one common electronic payment mechanism. This embodiment makes it possible for terminal equipments supporting different payment services, for example different generations of terminal equipments, to use one common payment mechanism in the same network or in different networks. Changes in the common payment mechanism or in a payment mechanism supported by a terminal equipment require modifications only in the service gateway according to the invention and they do not affect the other payment mechanisms or terminal equipments.

The invention also relates to equipments according to claims 10, 11 and 12.

BRIEF DESCRIPTION OF THE DRAWINGS

In the following, the invention will be described by means of preferred embodiments with reference to the accompanying drawing, in which.

PREFERRED EMBODIMENTS OF THE INVENTION

As stated above, the basic principle of the preferred embodiment of the invention is to provide a terminal equipment of a telecommunication system with one general-purpose payment mechanism and to include all computer programs and mechanisms related to a certain payment mechanism in a service unit, i.e. a service gateway, which is located in the network infrastructure and via which transactions are forwarded. This service gateway then acts on behalf of the terminal equipment towards the other transacting party by using the electronic payment method supported by the other party.

Figure 1:
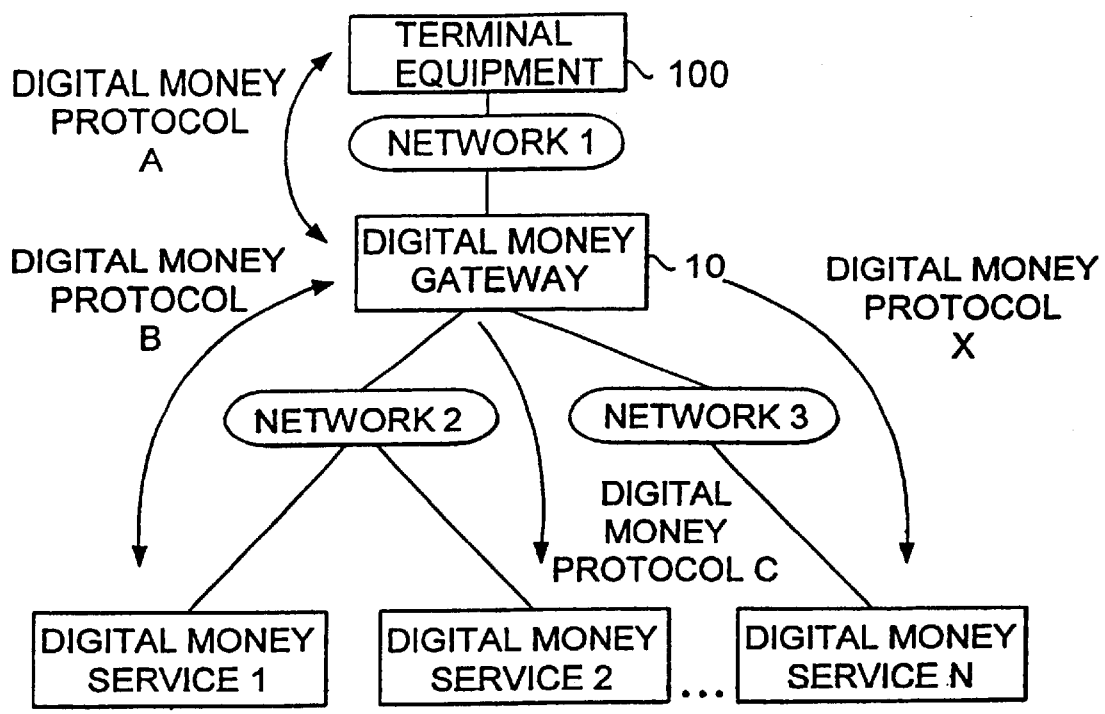
FIGS. 1 and 2 illustrate payment systems according to the preferred embodiments of the invention.

Such a payment system is illustrated in FIG. 1. A service gateway 10 according to the invention, also called an electronic money gateway, provides terminal equipments 100 of a telecommunication network 1 with one universal payment mechanism that employs an electronic payment protocol, i.e. a digital money protocol A. On the other hand, the service gateway 10 can carry out transactions with one or several other digital money protocols B,C, . . . ,X with digital money services 1,2, . . . ,N via telecommunication or data networks 2 and 3. In the transactions the service gateway 10 performs the required adaptations between the general protocol A and the protocol B,C, . . . or X used by the other party. It should be noted that the protocol used by the other party may also be the same as the protocol of the terminal equipment 100, i.e. protocol A. Even in such a case, the invention provides the advantage that the anonymity of the client using the terminal equipment 100 can be maintained, if desired, when the service gateway 10 performs the transaction.

Figure 2:
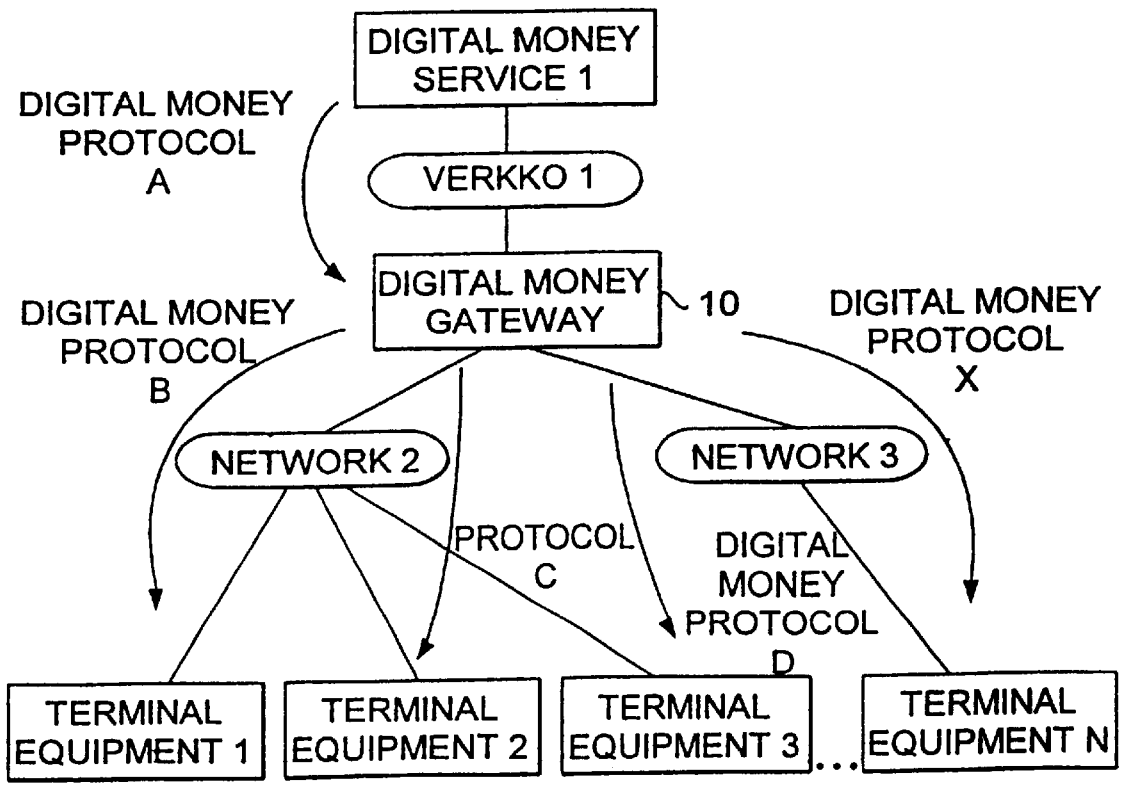

The basic principle of the second embodiment of the invention is illustrated in FIG. 2. In the figure, the service gateway 10 according to the invention provides terminal equipments 1,2,3, . . . ,N of telecommunication networks 2 and 3, which correspondingly support different digital money protocols B,C,D, . . . ,X, with access to a digital money service 1 that supports the digital money protocol A. This second embodiment of the invention may also be advantageous when the generations of terminal equipments located in the telecommunication networks and supporting the old payment mechanisms must be adapted to the digital money protocol A that will be the final standard.

Another embodiment of the invention is a combination of the embodiments of FIGS. 1 and 2. In this third embodiment, the service gateway 10 according to the invention provides several terminal equipments 1,2,3, . . . ,N, which correspondingly support different digital money protocols B,C,D, . . . X (as shown in FIG. 2), with access to several digital money services 1,2, . . . ,N, which correspondingly support different digital money protocols B,C,D, . . . ,X (as in FIG. 1). The service gateway 10 according to the invention selects in each transaction the suitable protocols for the terminal equipment and for the digital money service independently and carries out the required protocol adaptation between the selected protocols.

The payment service system according to the invention may also be a combination of these two embodiments.

Figure 3:
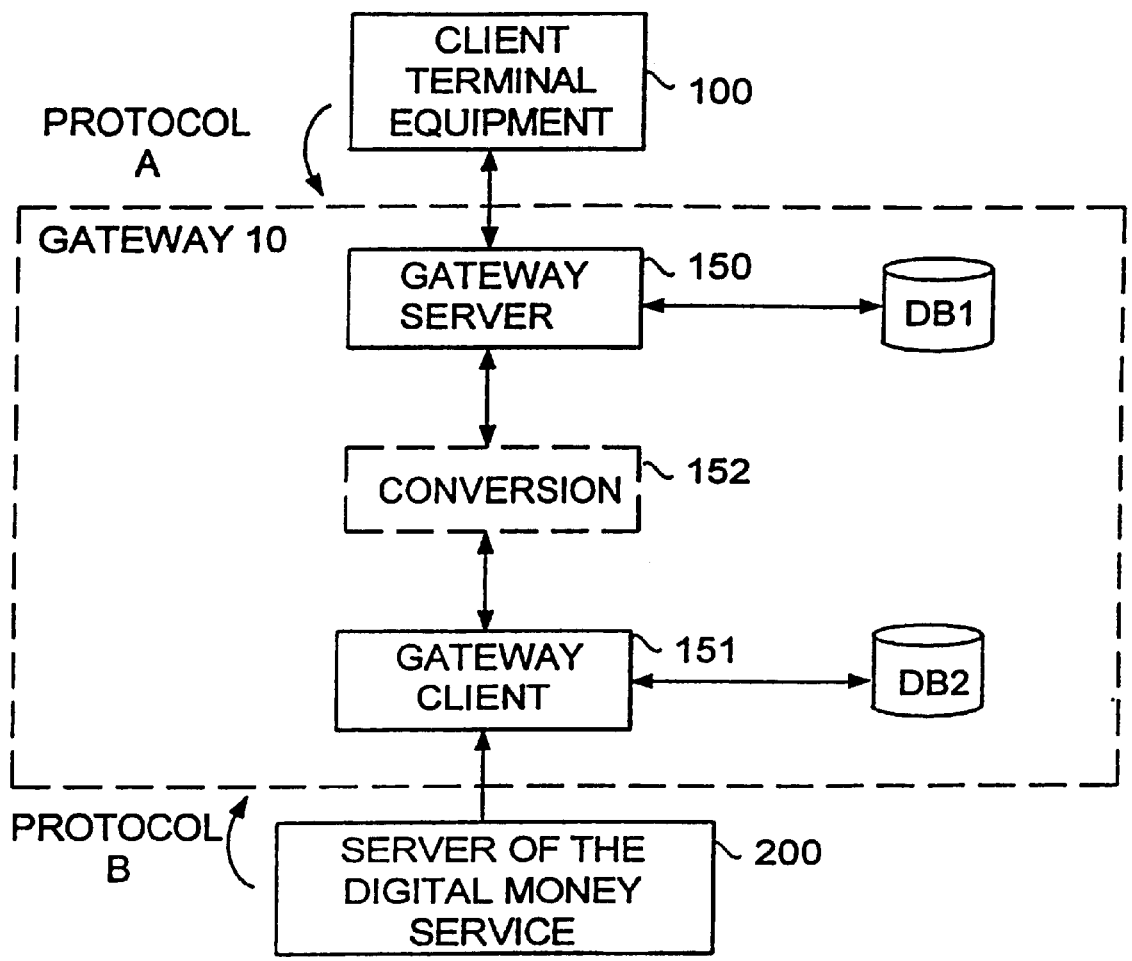
FIGS. 3 and 4 are functional block diagrams of two service gateways according to the invention.

The implementation of the service gateway 10 according to the invention may vary a great deal. A basic implementation of the service gateway 10 is illustrated in FIG. 3. The gateway 10 comprises a server 150 that provides a client terminal equipment 100 with a payment service according to digital money protocol A. The server 150, called a gateway server, is connected to a database DB1 which stores the electronic money according to protocol A for the subscriber of the terminal equipment 100. The gateway 10 also comprises a gateway client 151 that acts on behalf of the terminal equipment 100 as a "client" towards the digital money service 200 by using digital money protocol B. The gateway client 151 is connected to a database DB2 which stores the digital money according to protocol B. The gateway server 150 and the gateway client 151 perform the required conversions between protocols A and B, which is illustrated with a conversion block 152. The digital money according to protocol A in database DB1 belongs preferably to the user of the terminal equipment 100, but the digital money according to protocol B in database DB2 may belong to the owner of the service gateway 10. This makes it possible to conceal the identity of the person who is actually paying in transactions.

Examine a transaction as an example. The server of the digital money service 200 wants to have a payment for its service and it transmits a payment request to its "client" through protocol B. The gateway client 151 receives the payment request through protocol B. The payment request is subjected to conversion 152 and forwarded to the gateway server 150 that transmits it to the terminal equipment 100 through payment protocol A. The terminal equipment 100 makes an electronic payment to the gateway server 150 with digital money protocol A. The payment is subjected to conversion 152, and the gateway client makes the payment to the server of the digital money service 200 through payment protocol B.

The service gateway 10 according to the invention may also operate in such a way that when the server of the digital money service 200 transmits a payment request through protocol B, the gateway client 151 immediately makes the payment to the server of the digital money service 200 through payment protocol B and charges the client only afterwards.

Between the service gateway 10 and the terminal equipment 100 there may be for example:

charging according to the digital money standard, i.e. for example electronic tokens the charge to be added to the mobile station (e.g. the CDR charging files of the GSM)

a fixed monthly charge a pulse counter of a phone prepaid or credit money.

The charging used between the service gateway 10 and the digital money service 200 may be as described above or:

some other digital money standard some other type of currency (e.g. a dollar instead of a mark).

Figure 4:
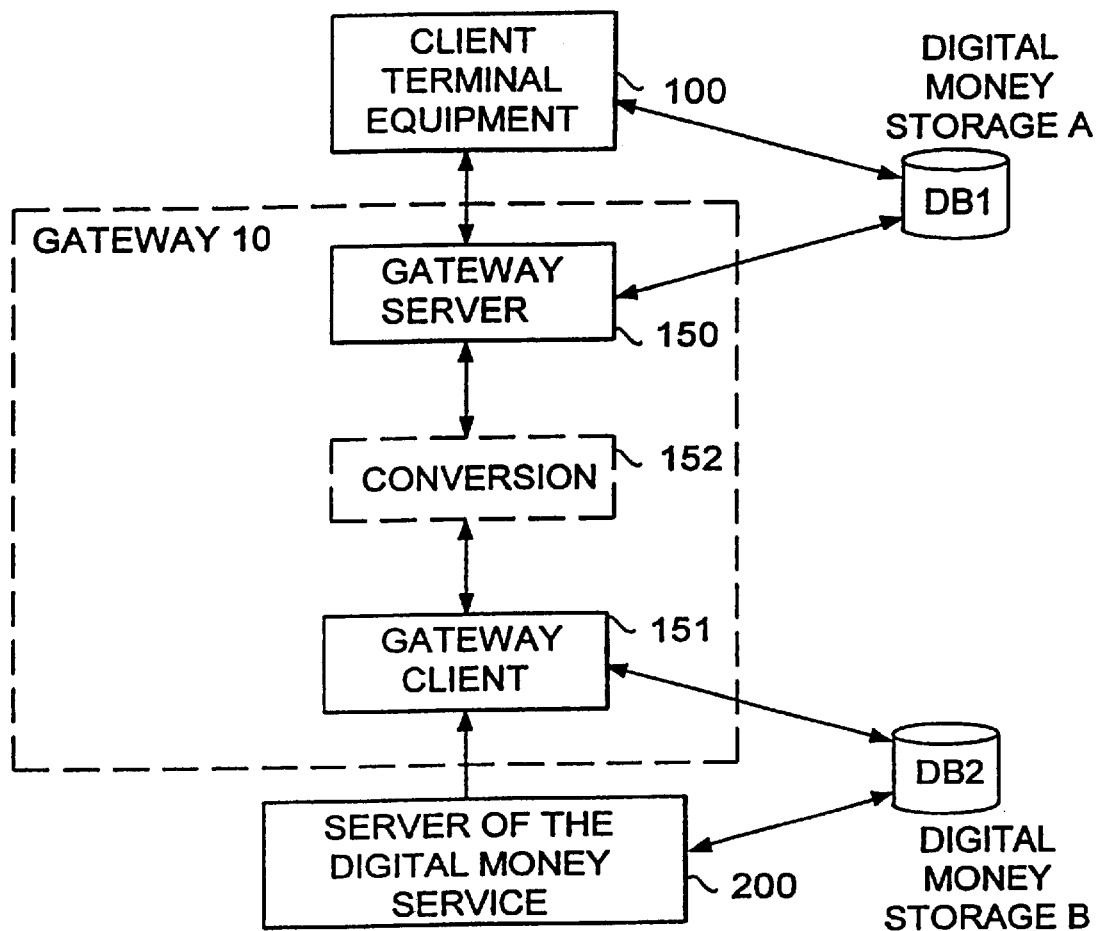

The service gateway may also be implemented without its own databases DB1 and DB2. FIG. 4 illustrates a service gateway 10 using external digital money storages A and B. The gateway 10 is otherwise similar to the one shown in FIG. 3.

The general principles of the invention are described above. The primary field of application of the invention is in mobile communications systems, and the invention will be described below in greater detail in connection therewith.

Figure 6:
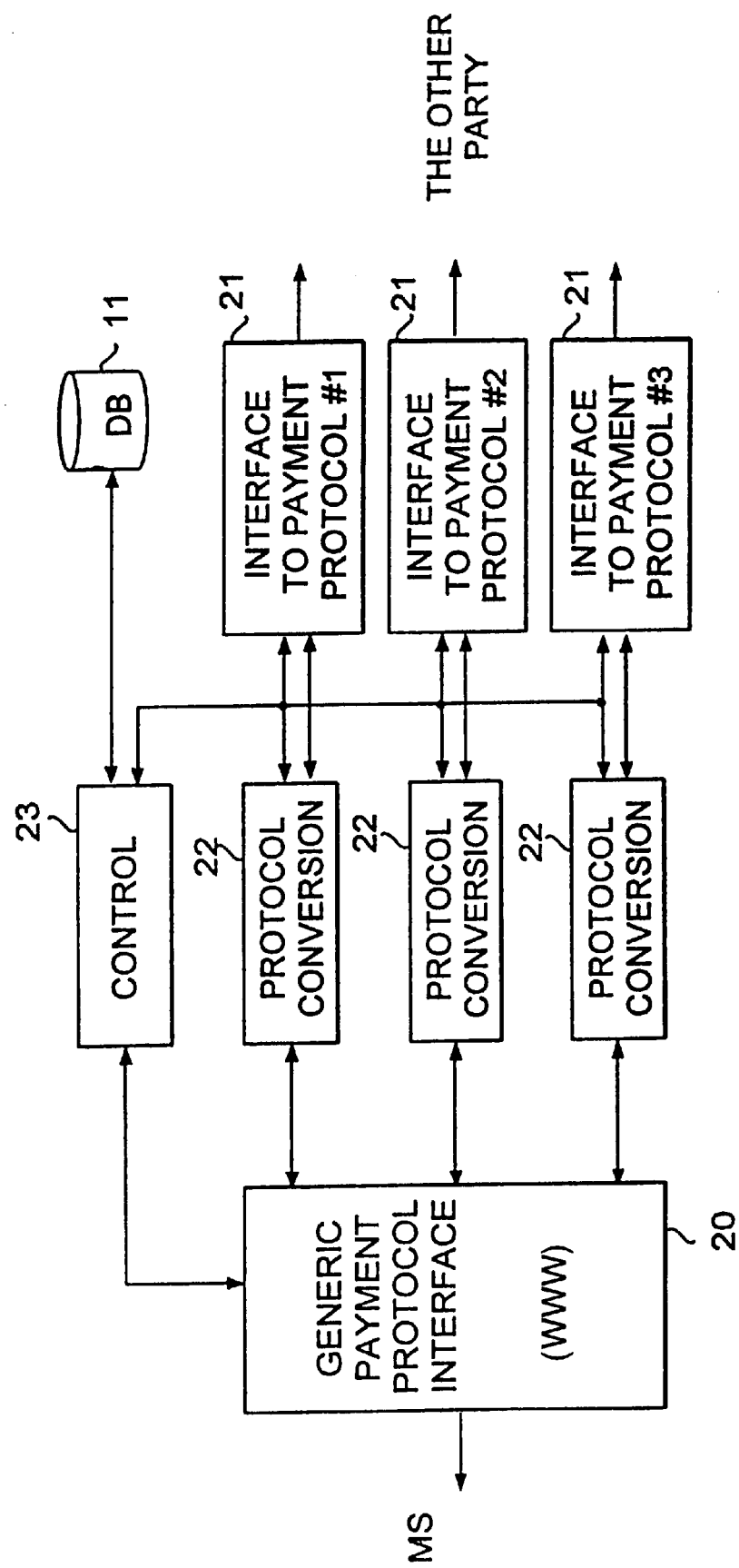
FIG. 6 is a general functional block diagram of yet another service gateway according to the invention.

FIG. 6 is a general functional block diagram of a service gateway 20 that provides, according to the principles of the invention, all mobile stations MS with one generic payment protocol interface 20. The digital payment protocol used in the interface 20 may be a generally used payment protocol or mechanism, or it may have been designed specifically for this purpose. In the preferred embodiment of the invention, since there is an Internet connection between the mobile station MS and the service gateway 10, the payment interface of the mobile station is a World Wide Web (WWW) page or any standard digital payment protocol. The service gateway 10 of FIG. 6 further comprises payment protocol interfaces 21 according to specific standards, by means of which interfaces the service unit 10 processes transactions with the other party, such as a shop. The embodiment of FIG. 6 shows three payment protocol interfaces that support payment protocols #1, #2, and #3. These protocols may be any payment mechanisms according to the general standards. Between the generic payment protocol interface 20 and each specific payment protocol interface 21 there is a protocol conversion unit 22 that performs the required protocol conversions and adaptations between the general payment protocol and the specific payment protocol in each transmission direction. The interfaces 20 and 21 and the protocol conversion units 22 are controlled in a centralized manner by a control unit 23. The control unit 23 also controls the reading and writing of data from and into a payment service database 11. The payment service database 11 stores all the subscriber-specific data related to the payment service, such as data about the amount of credit available to the subscriber, and the digital cash available to the subscriber and located in a special file called an electronic purse, etc. It should be noted, however, that the database 11 is not necessarily needed, as the example of FIG. 4 illustrates. The electronic purse may also be located for example in a mobile station or somewhere else.

Figure 5:
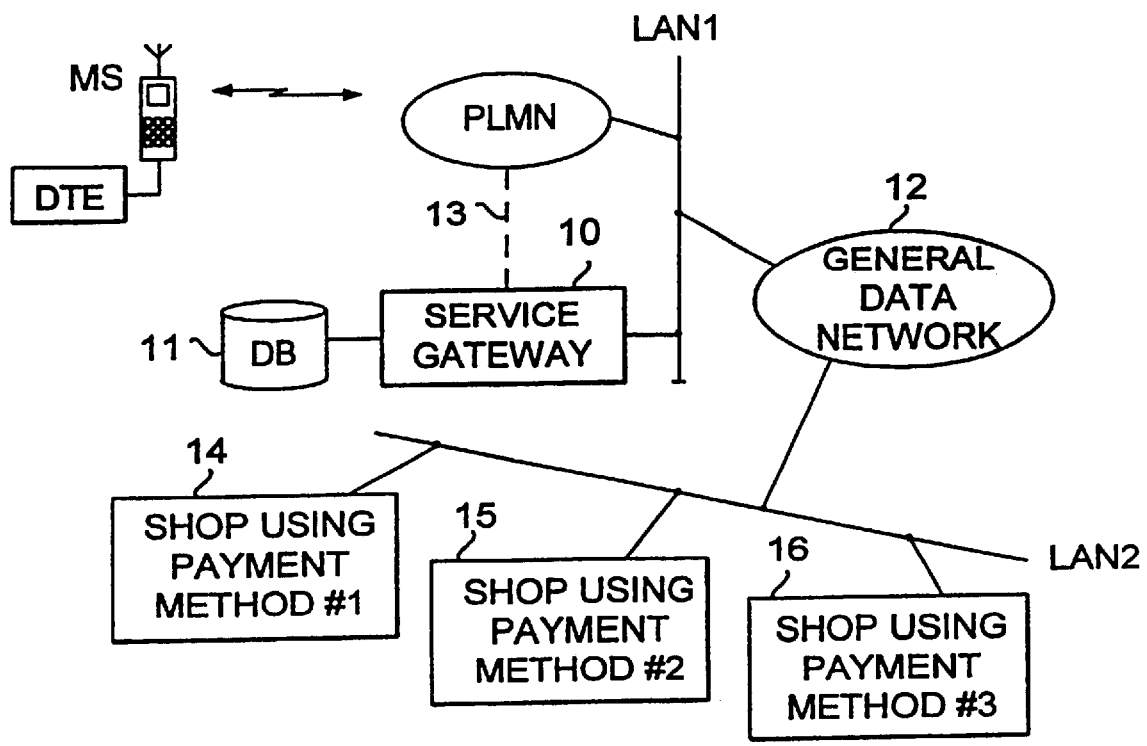
FIG. 5 illustrates a service gateway according to the invention and its integration into data networks and mobile networks.

In the embodiment of the invention shown in FIG. 5, the public land mobile network (PLMN) and the service unit 10 according to the invention are connected together and to the public data network 12 via a local area network LAN1. The LAN1 may be for example a local area network of the PLMN operator, interconnecting for example the mobile services switching centres of the PLMN. In such a way one service gateway is able to service all mobile services switching centres through the local area network.

The communication related to the transaction between the mobile station MS and the service gateway 10 is performed via a data connection established through the PLMN. This data connection may be a switched data connection, or a virtual data connection, such as a packet switched connection, etc. If the PLMN provides a short message service, the generic payment interface can also be realized in such a way that the mobile station MS communicates by means of the short message service with a payment short message service centre that is in turn connected to the local area network LAN1. Another alternative is that instead of being connected via the local area network LN1, the service gateway 10 is directly connected to the PLMN, as illustrated in FIG. 5 with a broken line 13. For example when the aforementioned short message service is used, the connection 13 may be realized for instance in the same way as a normal connection between the short message centre and the PLMN. In any case the service gateway 10 has a data connection with some public data network, either directly, via a local area network or through some other transmission mechanism.

It is emphasized that the electronic payment protocols are end-to-end user application protocols, i.e. user data which is carried in the user data fields of lower level communications protocols, such as Transmission Control Protocol/Internet Protocol (TCP/IP). Therefore, it is not relevant to the payment protocols or to the present invention which communication protocols are employed in different communications networks or whether there is a need for adaptation between communication protocols.

As it is apparent from the above, the connection between the mobile station MS and the service gateway 10 can be carried out in several ways depending on the mobile system. Therefore the invention is not restricted to a specific mobile system or to a certain manner of implementing the connection between a mobile station MS and the service gateway 10 in order to perform a transaction. An example of a PLMN where the present invention can be applied is the Pan-European digital mobile system GSM that is described in greater detail in the GSM recommendations and in The GSM System for Mobile Communications by M. Mouly and M. B. Pautet, Palaiseau, France, ISBN:2-9507190-0-7. To illustrate a data connection established between a data terminal equipment DTE (e.g. PC) connected to the mobile station MS and the general data network, reference is made to a previous international patent application by the Applicant, PCT/FI94/00413. In this reference, a special access computer that provides a connection to the data network is used in association with a mobile services switching centre. The connection to the data network is maintained during the entire data session, but the connection between the mobile station and the access computer is only established for the actual data transmission, which saves radio resources and connection costs. The connection to be used in the payment mechanism according to the invention between the mobile station MS and the service gateway 10 through the local area network LAN1 can be realized for example with this known manner, preferably as an Internet connection. It is also possible that the service gateway 10 according to the invention is connected to such an access computer. The advantage of the service gateway 10 connected through the local area network is that it can service all the mobile services switching centres of the operator commonly.

In the following, the adaptation of the payment service according to the invention to a mobile system will be explained by means of an exemplary transaction. With reference to FIG. 5, assume that three shops 14, 15 and 16, which use digital payment protocols #1, #2 and #3, respectively, are connected to the general data network 12 via a second local area network LAN2. Assume further that a user using a mobile station MS purchases services from a shop 15 and uses the digital payment service according to the invention to pay for the services via the mobile station MS. The payment for the services obtained corresponds to an amount A of digital cash. The shop 15, more precisely the computer or the cash system of the shop, requests for the amount of cash A from a network address given by the client in a manner according to the payment protocol #2 used by shop 15. This network address is the network address of the service gateway 10, and therefore the request is routed through the local area network LAN2, the public data network 12 and the local area network LAN1 to the service gateway 10. The service gateway 10 receives the request at the payment protocol interface 21 which supports the payment protocol #2. The control unit 23 checks from the database 11 whether the electronic purse of the user contains a sufficient quantity of digital cash to pay the amount A. If it does not, the control unit 23 indicates this to the payment protocol interface 21, which in turn forwards the information to the shop 15 by using a message according to the payment protocol #2. If the database 11 comprises a sufficient amount of digital cash to make the payment, the control unit indicates this to the interface unit 21, whereafter the interface 21 transmits a payment request to the generic payment protocol interface 20 via the protocol conversion 22. The payment protocol interface 20 in turn transmits a payment request to the mobile station in a manner according to the general digital payment protocol. The mobile station MS receives the payment request and presents it to the user for example on a display of a mobile station or a data terminal equipment. If the user accepts the payment by means of a command input for example from the keyboard of the mobile station or the data terminal equipment, the mobile station MS transmits an acknowledgment message to the service gateway 10 via the PLMN and the local area network LAN1. The generic payment protocol interface 20 receives the message of acknowledgment and forwards it via the protocol conversion 22 to the payment protocol interface 21. The payment protocol interface 21 indicates the acknowledgement to the control unit 23, which transfers digital cash corresponding to the required amount A from the electronic purse of the user located in the database 11 to the payment protocol interface 21. The payment protocol interface 21 further transmits the digital money to the shop 15 in a manner according to payment protocol #2. The digital money may be in different forms in payment protocols #1 and #2, wherefore two databases may be needed, as illustrated in FIGS. 3 and 4.

The financial resources of the user can also be checked only after the user has accepted the transaction.

When the other payment protocols #1 and #3 are used, the operation is the same for the generic payment protocol interface as during the use of payment protocol #2. On the other hand, the operation of the control unit 23 and the data in the database 11 may differ. For example if payment protocol #1 is based on the credit of the user, the control unit 23 checks from the database 11 whether the user has a sufficient amount of credit left to make the payment, and when it accepts the payment it increases the amount of credit with the sum paid.

The service gateway 10 may also be arranged to automatically charge the electronic money spent by the user. This may be realized by different methods. The money spent may be included in the telephone bill of the mobile subscriber, or it can be charged later separately, or it may have been prepaid, or some other method of payment might have been used.

It should also be noted that only one possible implementation of the service gateway according to the invention and the operation thereof are described above. There are several alternative embodiments that are obvious for a person skilled in the art on the basis of this example.

The figures and the description related thereto are only intended to illustrate the present invention. The details of the invention may vary within the scope of the appended claims.

What is claimed:

1. A mobile communication system comprising
   mobile terminal equipments;
   at least one serving mobile network element;
   a payment service gateway connected to said serving mobile network element and to a general data network for performing electronic payment transactions between said mobile terminal equipments located in said mobile communication system and another transacting party connected to said general data network;
   said payment service gateway comprising a first payment protocol interface supporting a first electronic payment protocol for payment transactions with the mobile terminal equipments over an Internet Protocol (IP) connection established to the respective mobile terminal equipment by means of said at least one serving mobile network element, said first payment protocol interface comprising at least one World Wide Web page;
   said payment service gateway comprising at least one further payment protocol interface that is connected to said general data network and that supports a different electronic payment protocol as said first electronic payment protocol interface for payment transactions with the other transacting party; and
   the payment service gateway is arranged to perform the protocol conversion of the payment transaction between the first protocol payment interface and said at least one further payment protocol interface.

2. A system according to claim 1, wherein said payment service gateway is connected directly to the mobile network.

3. A mobile communication system as claimed in claim 1, wherein said mobile communications system further comprises a local area network interconnecting said at least one serving mobile network element and said payment service gateway.

4. A method for performing an electronic payment transaction in a mobile communication system comprising mobile terminal equipments, at least one serving mobile network element, and a payment service gateway connected to said serving mobile network element and to a general data network for performing electronic payment transactions between said mobile terminal equipments located in said mobile communication system and another transacting party connected to said general data network, said method comprising steps of:
   routing the payment transaction through the payment service gateway;
   using the same general electronic payment protocol based on a World Wide Web user interface in all payment transactions carried out between the mobile terminal equipment and the gateway over an Internet Protocol (IP) connection established to the respective mobile terminal equipment by means of said at least one serving mobile network element, regardless of the electronic payment protocol of said other party;
   using the electronic payment protocol of said other party in each payment transaction between the gateway and said other party over said general data network; and
   performing a protocol conversion in said payment service gateway between said general payment protocol and the payment protocol of each other party.

5. A mobile communication system comprising
   mobile terminal equipments;
   at least one serving mobile network element;
   a payment service gateway connected to said serving mobile network element and to a general data network for performing an electronic payment transaction between a mobile terminal equipment located in a telecommunication system and another transacting party connected to said general data network;
   said payment service gateway comprising a first payment protocol interface supporting the first electronic payment protocol for payment transactions with said other party over said general data network;
   said payment service gateway comprising a set of further payment protocol interfaces which are connected to said at least one serving mobile network element and which support a set of different electronic payment protocols as said first payment protocol interface for payment transactions with the mobile terminal equipments over an Internet Protocol (IP) connection established to the respective mobile terminal equipment by means of said at least one serving mobile network element; and
   the payment service gateway being arranged to perform the protocol conversion of the payment transactions between the first payment protocol interface and said set of said further payment protocol interfaces.

6. A method for performing an electronic payment transaction in a mobile communication system comprising mobile terminal equipments, at least one serving mobile network element, and a payment service gateway connected to said serving mobile network element and to a general data network for performing electronic payment transactions between said mobile terminal equipments located in said mobile communication system and another transacting party connected to said general data network, said method comprising steps of:
   supporting in the mobile communication system at least two different electronic payment protocols;
   routing payment transactions of the mobile terminal equipments via said payment service gateway;
   using a common general electronic payment protocol in all payment transactions between the other party and the gateway over said general data network regardless of the electronic payment protocol used by the mobile terminal equipment in the specific transaction;
   using the electronic payment protocol of the specific mobile terminal equipment in each payment transaction between the gateway and the mobile terminal equipment over an Internet Protocol (IP) connection established to the respective mobile terminal equipment by means of said at least one serving mobile network element; and
   performing a protocol conversion In said payment service gateway between said common general payment protocol and the payment protocol of the specific mobile terminal equipment in the specific transaction.

7. An apparatus for performing a transaction in a mobile communication system comprising mobile terminal equipments and at least one serving mobile network element, said apparatus being connected to said serving mobile network element and to a general data network for performing electronic payment transactions between said mobile terminal equipments located in said mobile communication system and another transacting party connected to said general data network, the apparatus comprising:
   means based on a World Wide Web user interface for performing a transaction between the mobile terminal equipment and the apparatus by using a first common electronic payment protocol in all payment transactions between the mobile terminal equipment and the apparatus over an Internet Protocol (IP) connection, the first general electronic payment protocol being common to all mobile terminal equipments and independent of a second electronic payment protocol supported by the other party;
   means for performing a payment transaction between said other party and the apparatus over said general data network by using the second electronic payment protocol supported by said other party; and
   means for performing a protocol conversion between said first electronic payment protocol and the second electronic payment protocol.

8. An apparatus for performing an electronic payment transaction in a mobile communication system comprising mobile terminal equipments and at least one serving mobile network element, said apparatus being connected to said serving mobile network element and to a general data network for performing electronic payment transactions between said mobile terminal equipments located in said mobile communication system and another transacting party connected to said general data network, the apparatus comprising:
   means for performing a payment transaction between said other party and the apparatus by using in each transaction a first general electronic payment protocol that is independent of a second electronic payment protocol supported by the mobile terminal equipments;

means based on a World Wide Web user interface for performing a payment transaction between the terminal equipment and the apparatus over an Internet Protocol (IP) connection by using the second electronic payment protocol supported by the mobile terminal equipment; and means for performing a protocol conversion between said first general electronic payment protocol and the second electronic payment protocol.

9. An apparatus for performing an electronic payment transaction in a mobile communication system comprising mobile terminal equipments and at least one serving mobile network element, said apparatus being connected to said serving mobile network element and to a general data network for performing electronic payment transactions between said mobile terminal equipments located in said mobile communication system and another transacting party connected to said general data network, the apparatus comprising:

means for performing a payment transaction between any mobile terminal equipment and the apparatus by using an electronic payment protocol supported by each specific mobile terminal equipment;

means for performing a payment transaction between said other party and the apparatus over said general data network by using the electronic payment protocol of said other party; and means for performing a protocol conversion between the electronic payment protocol supported by each specific other party and the electronic payment protocol supported by each specific mobile terminal equipment in a transaction over an Internet Protocol (IP) connection established to the respective mobile terminal equipment by means of said at least one serving mobile network element.

10. A mobile communication system comprising:

mobile terminal equipments;

a local area network;

a payment service gateway connected to said local area network and to a general data network for performing electronic payment transactions between said mobile terminal equipments located in said mobile communication system and another transacting party connected to said general data network;

an access computer which is connected to said local area network and establishes virtual data connections over an air interface between the access computer and said mobile terminal equipments;

said payment service gateway having:

a first payment protocol interface supporting a first electronic payment protocol for payment transactions with the mobile terminal equipments over an Internet Protocol (IP) connection established to the respective mobile terminal equipment by means of said access computer, at least one further protocol interface that is connected to said general data network for payment transactions with the other transacting party and that supports a different electronic payment protocol as said first electronic payment protocol interface, and the payment service gateway being arranged to perform the protocol conversion of the payment transaction between the first and said at least one further payment protocol interface.

11. A mobile communication system as claimed in claim 10, wherein said first electronic payment protocol interface of said mobile terminal comprises a World Wide Web page.

12. A mobile communication system comprising:

mobile terminal equipments;

a local area network;

a payment service gateway connected to said local area network and to a general data network for performing electronic payment transactions between said mobile terminal equipments located in said mobile communication system and another transacting party connected to said general data network;

an access computer which is connected to said local area network and establishes virtual data connections over an air interface between the access computer and said mobile terminal equipments;

said payment service gateway comprising a first payment protocol interface supporting the first electronic payment protocol for payment transactions with said other party over said general data network;

said payment service gateway comprising a set of further payment protocol interfaces that supports a set of different electronic payment protocols as said first payment protocol interface for payment transactions with the mobile terminal equipments over an Internet Protocol (IP) connection established to the respective mobile terminal equipment by means of said access computer; and the payment service gateway being arranged to perform the protocol conversion of the payment transactions between the first payment protocol interface and said set of said further payment protocol interfaces.

13. A mobile communication system as claimed in claim 12, wherein said first electronic payment protocol interface of said mobile terminal comprises a World Wide Web page.

14. A mobile communication system comprising:

mobile terminal equipments;

a local area network;

a payment service gateway connected to said local area network and to a general data network for performing electronic payment transactions between said mobile terminal equipments located in said mobile communication system and another transacting party connected to said general data network;

an access computer which is connected to said local area network and establishes virtual data connections over an air interface between the access computer and said mobile terminal equipments;

said payment service gateway comprising a first set of payment protocol interfaces supporting a first set of electronic payment protocols for payment transactions with said other party over said general data network;

said payment service gateway comprising a second set of payment protocol interfaces that support a second set of electronic payment protocols payment transactions with the mobile terminal equipments over an Internet Protocol (IP) connection established to the respective mobile terminal equipment by means of said access computer; and the payment service gateway being arranged to perform the protocol conversion of the payment transactions between the first and second sets of payment protocol interfaces.

15. A mobile communication system as claimed in claim 14, wherein said first electronic payment protocol interface of said mobile terminal comprises a World Wide Web page.

16. A mobile communication system comprising:

mobile terminal equipments;

an access computer which establishes virtual data connections over an air interface between the access computer and said mobile terminal equipments;

a payment service gateway connected to said access computer and to a general data network for performing electronic payment transactions between said mobile terminal equipments located in said mobile communication system and another transacting party connected to said general data network;

said payment service gateway supporting a first set of electronic payment protocols for payment transactions with said other party over said general data network;

said payment service gateway supporting a second payment protocol for transactions with the mobile terminal equipments over an Internet Protocol (IP) connection established to the respective mobile terminal equipment by means of said access computer; and the payment service gateway being arranged to perform the protocol conversion of the payment transactions between the first and second payment protocols.

17. A mobile communication system as claimed in claim 16, wherein said first electronic payment protocol interface of said mobile terminal comprises a World Wide Web page.

* * * * *